ID [19] United States Patent
Udy

[11] Patent Number: 6,011,104
[45] Date of Patent: Jan. 4, 2000

[54] FOOTWARE DRESSINGS INCORPORATING FLUOROCARBONS

[76] Inventor: Joseph D. Udy, 4466 S. Helena Way, Apt. #362, Aurora, Colo. 80015-4415

[21] Appl. No.: 09/009,697

[22] Filed: Jan. 20, 1998

[51] Int. Cl.[7] .............................. C08K 5/02; C09G 1/08
[52] U.S. Cl. .............................. 524/462; 524/72; 524/77; 524/81; 524/277; 524/463; 106/3; 106/6; 106/10; 106/271; 106/272
[58] Field of Search .................. 524/72, 77, 81, 524/277, 462, 463; 106/3, 6, 10, 271, 272

[56] References Cited

U.S. PATENT DOCUMENTS

| | | | |
|---|---|---|---|
| 3,622,532 | 11/1971 | Kolb | 260/29.6 H |
| 3,849,822 | 11/1974 | Ouellette | 15/36 |
| 4,066,818 | 1/1978 | Junge | 428/341 |
| 4,073,984 | 2/1978 | Okabe | 427/444 |
| 4,208,213 | 6/1980 | Muller | 106/10 |
| 4,330,597 | 5/1982 | Heins | 428/473 |
| 4,363,893 | 12/1982 | Hersh | 524/376 |
| 4,631,063 | 12/1986 | Stockhausen | 8/94.21 |
| 5,017,222 | 5/1991 | Cifuentes et al. | 106/10 |
| 5,374,362 | 12/1994 | McFarland | 252/8.6 |
| 5,591,796 | 1/1997 | Wisniewski et al. | 524/484 |
| 5,614,005 | 3/1997 | Leung | 106/10 |
| 5,732,479 | 3/1998 | Pavelescu | 36/12 |
| 5,749,949 | 5/1998 | Tavares | 106/313 |
| 5,760,126 | 6/1998 | Engle et al. | 524/516 |

OTHER PUBLICATIONS

164015F Sep. 1996 Dupont Zonyl(R) Technical Information, 2 sheets, see Typical Applications.
226986E Nov. 1996 Dupont Teflon/Tefzel(R) Product Information brochure, see p. 6.
H–44662 Nov. 1996 Dupont Teflon Fluoroadditives brochure, see p. 18.

*Primary Examiner*—Samuel A. Acquah

[57] ABSTRACT

Footware dressings containing fluorocarbons in a carrier base plus optional colorants and additives. These dressings create a relatively slick and non-stick surface with excellent "contamination" resistance.

1 Claim, No Drawings

FOOTWARE DRESSINGS INCORPORATING FLUOROCARBONS

BACKGROUND

Field of Invention

This invention relates to footware dressings, specifically to such dressings which incorporate fluorocarbons.

BACKGROUND

Description of Prior Art

Footware is commonly dressed with materials which can, broadly and loosely, be classified as "liquids". These materials, usually composed of waxes, greases, pigments, and additives, are often semi-solid at room temperature and usually melt when heated slightly and/or applied.

U.S. Pat. No. 5,614,005 to Leung (1997) is a typical state of prior art dressing based on "liquids", These prior dressings typically behave as "liquids", during and after application, by migrating or diffusing into or through the footware covering, thereby decreasing "surface effectiveness" as time passes.

Exemplary prior approaches to the problem of "surface effectiveness" decay are listed:
- U.S. Pat. No. 3,622,532 to Kolb (1971), carbamic acid esters;
- U.S. Pat. No. 4,066,818 to Junge (1978), nitrocellulose and polyuretilane resin;
- U.S. Pat. No. 4,330,597 to Heins (1982), rubber latices;
- U.S. Pat. No. 4,363,893 to Hersh (1982), acrylic resin;
- U.S. Pat. No. 4,631,063 to Stockhausen (1986), sulfonic acid polymers.

These approaches, generally, build a new organic layer on top of the footware surface and are likely to introduce the problems of cracking and peeling in high flex areas.

U.S. Pat. No. 4,208,213 to Muller (1980) includes fine silica ($SiO_2$), basically sand, an abrasive which is likely to be detrimental in high flex areas of footware.

OBJECTS AND ADVANTAGES

Footware dressings incorporating fluorocarbons, a solid state lubricant, are likely to be beneficial in high flex areas of footware, particularly at the welt searm.

These solid state lubricant particles are likely to minimize tile problems of cracking and peeling in high flex areas.

These entrained solid state lubricant particles are likely to remaining stable in the footware surface and retard "surface effectiveness" decay. Repeated applications, of footware dressings incorporating fluorocarbons, will likely increase the amount of solid state lubricant entrained ill the footware surface, thereby increasing "surface effectivess".

No drawings accompany this application.

SUMMARY

Footware dressings incorporating fluorocarbons can contain, belt are not limited to, a lanolin carrier base, plus fluorocarboin particles, plus optional colorants, plus optional additives.

DESCRIPTION

Footware dressings incorporating fluorocarbons can have four general ingredient classes; 1.) fluorocarbons, 2.) carrier bases, 3.) optional colorants, and 4.) optional additives.

1.) Fluorocarbons refer to that class of materials made with fluorine arid carbon, and their polymers. One of these polymers, polytetrafluoroethylene, PIFE, (Teflon® by Dupont), is preferred. Zonyl® MP 1100, a micropowder of PTFE, is produced by Dupont of Delaware and is the preferred form. MP 1100 has a bulk aggregate particle size of 1.8 to 4.0 micrometers. The aggregate particles will break up with vigorous mixing, to a minimum 0.2 micrometer size. MP 1100 has a specific gravity of 2.1 to 2.3 and is a solid state lubricant.

2.) Carrier bases refer to that class of materials used as the carrier medium for the fluorocarbons, optional colorants and additives. These carrier bases are usually low melting point, slightly above room temperature; oils, greases, and waxes. These oils, greases, and waxes be natural or synthetic. Carrier bases can be single ingredient or combinations, as appropriate. Silicone oils, greases, or waxes (diluted with oderless mineral spirits) are), to read: . . . combinations, as appropriate. Silicone oils, greases or waxes (diluted with oderless mineral spirits) are the preferred carrier base.

3.) Colorants refer to that class of materials used to impart color to the footware dressing. These colorants are usually pigments or dye and can be used as single ingredient or combinations, as appropriate. Those footware dressings with colorants, waxes and additives are generally called polishes. These polishes could be made in almost any color or hue. Tote colorants are optional, for example, neutral polish has no colorants.

4.) Additives refer to that class of optional materials which could be added to the footware dressing composition to produce a desired end result. These additives could be natural or synthetic and used as single ingredient or combinations, for example, self-polishing additives.

There exist many possible separate embodiments of footware dressings incorporating fluorocarbons, each composed of specific ingredients, each would be new, and each could have a specific useful application. For example: one embodiment or footware dressings incorporating fluorocarbons, could have 1% to 50% fluorocarbon plus 50 to 99% Silicone oil plus oderless mineral spirits by weight of total composition, no colorant and no additives. This embodiment could be applied to oil tanned work boots, etc.

OPERATION

Footware dressings incorporating fluorocarbons would be utilized in the customary manitier. Namely, the appropriate dressing would be applied onto the surface of the footware and the surface would be briefed, if appropriate, until polished.

The carrier base would likely migrate into/through the footware covering, leaving fluorocarbon particles entrained in the surface pores of the footware covering. These entrained particles would not be visible or apparent to the naked eye.

The entrained fluorocarbon particles would occupy the space within the surface pores, thereby creating a smoother surface aild excluding "contaminants".

The lubricant properties of the entrained fluorocarbon particles would contribute to a relatively slick and non-stick surface, further excluding "contaminants".

The fluorocarbon particles have a specific gravity of 2.1 to 2.3, precluding buoyant displacement of the particles by most liquids. They sink.

Colorants and/or additives, if present in the dressings, would likely operate classically.

Detrimental interactions among components are likely to be minimal.

CONCLUSION, RAMIFICATIONS AND SCOPE

Footware dressings incorporating fluorocarbons are likely to be beneficial to the footware covering.

The lubricant properties of the entrained fluorocarbon particles are likely to minimize cracking arid peeling in high flex areas.

The lubricant properties of the (entrained fluorocarbon particles are likely to contribtite to the "contaminant" resistance of the footware surface.

The "cointaminant" resistance of the footware surface is likely to be stable and even increase with additional applications of footware dressings incorporating fluorocarbons.

The entrained fluorocarbons, being discrete particles, are likely to allow the footware covering to "breath".

The components of footwire dressings incorporating fluorocarbons are likely to be synergistic.

The concepts described in this patent application anticipate and may motivate further technology developments. The present preferred fluorocarbon is a micropowder of PTFE, a white solid. The white "coloration" limits the amount of fluorocarbon applied to some footware surfaces. Future technology could produce transparent fluorocarbon micropowders. For example: some fluoroetlhylene polymers (FEP) are transpareit, in thin section, and have a low melting point. When produced, FEP micropowdlers could be entrained, with additives, then melted, in situ, with radiant energy or as an aerosol the FEP micropowders could be melted in-transit, to impact the surface as liquid microdroplets, which solidify after impact; The cooled composite surface may have uniqiue properties. Foot-ware dressing, incorporating fluorocarbons, is at non-critical application and may be an end-use, for recycling fluorocarborns.

Footware dressings incorporating fluorocarbons could be produced in solid stick form, for example, with Beeswax as the carrier base.

Footware dressings incorporating fluorocarbons could be produced in aerosol form, for example, with silicone oil, as a carrier base, in an aerosol can for use on suede or fabrics.

Footware dressings with a high percentage of fluorocarbon could be applied to whiite footware, used by health-care workers, producing a "contaminant" resistant, more hygienic footware surface.

People in harsh outdoor environments; construction workers, soldiers, hurters, etc., may benefit from a relatively slick, non-stick surface on footware.

Footware dressings incorporating fluorocarbons, but without colorants (neutral), could be applied to multi-colored cowboy boots, inhibiting "contamination" by unpleasant materials.

Footware dressings incorporating fluorocarbons, with appropriate colorants, could be applied to horse riding tack, bicycle seats, handgun holsters, etc.

Common sense would generally prohibit application of footware dressings incorporating fluorocarbons to the soles of footware. However, application to the soles of roller blade boots, ice skates and snow slides may increase their useful life-times. Footware dressings incorporating fluorocarbons could be applied during footware production or applied as aftermarket footware dressings.

Speculation: Appropriate embodiments of footware dressings incorporating fluorocarbons could be applied to boat sails, or other surface, to decrease surface drag, or used as a bullet lubricant, or applied to the interior surface of footware, to reduce the frictional heat which causes blisters.

The concept of footware dressing incorporating fluorocarbons, appears to be unique and novel, due quite literally to "oversight" by past practitioners.

What is claimed as being new and desired to be protected by Letters Patent of the United States is as follows:

1. Footware dressings compositions comprising;
    a fluocrocarbon(s) selected from the group of fluorocarbons in an amount from about 100 to 1% weight of the total composition and
    a carrier base selected from the group of carrier bases in an amount from about 0 to 99% by weight of the total composition and
    an optional colorant selected from the group of pigments and dyes in an amount from about 0 to 99% by weight of the total composition and
    an optional additive selected from the group of natural and synthetic waxes, oils and classical additives in an amount from about 0 to 99% by weight of the total composition,
    whereby a dirt, stain, water resistant, relatively slick and non-stick surface can be created.

* * * * *

UNITED STATES PATENT AND TRADEMARK OFFICE
CERTIFICATE OF CORRECTION

PATENT NO.    : 6,011,104
DATED         : January 4, 2000
INVENTOR(S)   : Udy, Joseph D.

It is certified that error appears in the above-identified patent and that said Letters Patent is hereby corrected as shown below:

Title page, Item [54] and Column 1, line 1,
Title, change " FOOTWARE " to -- FOOTWEAR --.

Title page,
Item [57], ABSTRACT,
Line 2, change "Footware" to -- Footwear --.

Column 1,
Lines 7, 22, 37, 42, 46, 51, 52 and 54, change "footware" to -- footwear --.
Lines 13, 44, 59 and 65, change "Footware" to -- Footwear --.
Line 19, replace "," with -- . --.
Line 29, change "polyuretilane" to -- polyurethane --.
Line 46, change "searm" to -- seam --.
Line 49, change "tile" to -- the --.
Line 51, change "remaining" to -- remain --.
Line 54, change "ill" to -- in --.
Line 55, change "effectivess" to -- effectiveness --.
Line 60, change "belt" to -- but --.
Line 60, delete "lanolin".
Line 61, change "fluorocarboin" to -- fluorocarbon --.

Column 2,
Line 2, change "arid" to -- and --.
Line 3, change "PIFE" to -- PTFE --.
Line 3, insert -- brand) -- after "(Teflon (R)".
Line 15, insert -- can -- after "... waxes..." and before "..be..".
Lines 17-19, delete sentence, "Silicone oils, greases, or waxes (diluted with oderless mineral spirits) are), to read -- ...combinations, as appropriate. --.
Line 20, change "oderless" to -- odorless --.
Line 20, change "base" to -- bases --.
Lines 22, 39, 48, 52 and 53, change "footware" to -- footwear --.
Line 23, change "dye" to -- dyes --.
Line 27, change "Tote" to -- The --.
Line 36, change "ware" to -- wear --.
Line 39, change "or" to -- of --.
Line 41, change "oderless" to -- odorless --.
Line 46, change "Footware" to -- Footwear --.
Line 47, change "manitier" to -- manner --.
Line 49, change "briefed" to -- buffed --.
Line 59, change "aild" to -- and --.

UNITED STATES PATENT AND TRADEMARK OFFICE
CERTIFICATE OF CORRECTION

PATENT NO. : 6,011,104
DATED : January 4, 2000
INVENTOR(S) : Udy, Joseph D.

It is certified that error appears in the above-identified patent and that said Letters Patent is hereby corrected as shown below:

Column 3,
Lines 6, 39, 42 and 45, change "Footware" to -- Footwear --.
Line 7, 13, 14, 16, 18, 26, 46 and 48, change "footware" to -- footwear --.
Line 9, change "arid" to -- and --.
Line 11, delete "(".
Line 12, change "contribtite" to -- contribute --.
Line 14, change ""cointaminant"" to -- "contaminant" --.
Line 19, change "footwire" to -- footwear --.
Line 29, change "transpareit " to -- transparent --.
Line 30, change "micropowdlers " to --micropowders --.
Line 34, change "uniqiue" to -- unique --.
Line 34, change "Foot-ware" to -- Footwear --.
Line 36, change "at" to -- a --.
Line 38, change "borns." to -- bons. --.
Line 44, insert -- , -- after "can".
Line 46, change "whiite" to -- white --.

Column 4,
Line 2, change "hurters" to -- hunters --.
Lines 3, 13, 14, 17, 18, 19, 24 and 25, change "footware" to -- footwear --.
Lines 4, 8, 16 and 30, change "Footware" to -- Footwear --.
Line 15, change "slides" to -- shoes --.
Line 22, change "surface" to -- surfaces --.
Line 30, change "dressings" to -- dressing --.
Line 32, change "fluocrocarbon(s)" to -- fluorocarbon(s) --.

Signed and Sealed this

Thirty-first Day of January, 2006

JON W. DUDAS
*Director of the United States Patent and Trademark Office*